United States Patent
Jablonski

(10) Patent No.: US 11,684,023 B2
(45) Date of Patent: Jun. 27, 2023

(54) PLANT SUPPORT APPARATUS

(71) Applicant: Mark A. Jablonski, Worcester, MA (US)

(72) Inventor: Mark A. Jablonski, Worcester, MA (US)

(73) Assignee: Plant Halos by Castlewood LLC, Worcester, MA (US)

( * ) Notice: Subject to any disclaimer, the term of this patent is extended or adjusted under 35 U.S.C. 154(b) by 463 days.

(21) Appl. No.: 16/004,121

(22) Filed: Jun. 8, 2018

(65) Prior Publication Data
US 2019/0373818 A1    Dec. 12, 2019

(51) Int. Cl.
*A01G 9/12* (2006.01)
*F16M 13/02* (2006.01)

(52) U.S. Cl.
CPC ............ *A01G 9/128* (2013.01); *A01G 9/122* (2013.01); *F16M 13/02* (2013.01)

(58) Field of Classification Search
CPC .......... A01G 9/128; A01G 9/12; A01G 9/122
USPC ............................................................. D8/1
See application file for complete search history.

(56) References Cited

U.S. PATENT DOCUMENTS

| | | | | |
|---|---|---|---|---|
| 703,019 A * | 6/1902 | Thomas | .............. | A01G 9/12 47/47 |
| 839,423 A | 12/1906 | Richards | | |
| 1,377,832 A * | 5/1921 | Hanner | .............. | A01G 17/12 47/47 |
| 1,587,740 A * | 6/1926 | Wiswell | .............. | A01G 9/12 47/47 |
| 1,627,495 A * | 5/1927 | Effley | .............. | A01G 9/128 47/47 |
| 1,781,316 A * | 11/1930 | William, V | .............. | A01G 9/128 47/47 |
| 1,976,094 A * | 10/1934 | Ritchie | .............. | A01G 9/128 47/47 |
| 2,000,911 A * | 5/1935 | Balousek | .............. | A01G 9/12 47/47 |
| 2,009,668 A * | 7/1935 | Lay | .............. | A01G 9/128 47/47 |
| 2,152,018 A | 3/1937 | Barnhart | | |

(Continued)

FOREIGN PATENT DOCUMENTS

| | | | | |
|---|---|---|---|---|
| GB | 463818 A * | 4/1937 | ............ | A01G 9/128 |
| GB | 752211 A * | 7/1956 | ............ | A01G 9/122 |

*Primary Examiner* — Monica L Perry
(74) *Attorney, Agent, or Firm* — Morse, Barnes-Brown & Pendleton, P.C.; Sean D. Detweiler, Esq.

(57) ABSTRACT

The present application discloses a support apparatus having: (a) pole, aligned in an approximately vertical orientation when in use, and a cross section, wherein the pole comprises one or more pairs of diametrically opposed holes, positioned along the length of the pole; (b) a unitary open hoop, approximately in a plane, comprising an elastic material; and further comprising: a first end portion an a second end portion; wherein when in use, the hoop is compressed so that the first end portion and the second end portion are urged past each other to form a parallel locus; and wherein when the hoop is compressed, the first end portion and the second end portion are formed as if bent to mate with and apply an opposed tension to a pair of diametrically opposed holes in the pole; and wherein when the hoop is compressed, the parallel locus engages with the pole to impede the vertical swing of the hoop.

18 Claims, 3 Drawing Sheets

(56) References Cited

U.S. PATENT DOCUMENTS

| | | | | |
|---|---|---|---|---|
| 2,484,449 A | * | 10/1949 | Fetterman | E04H 17/10 |
| | | | | 256/57 |
| 2,764,846 A | * | 10/1956 | Worthington | A01G 9/128 |
| | | | | 47/47 |
| 2,851,823 A | * | 9/1958 | Peterson | A01G 9/128 |
| | | | | 47/47 |
| 2,903,823 A | * | 9/1959 | Westford | A01G 9/122 |
| | | | | 47/47 |
| 3,018,898 A | * | 1/1962 | Frazelle | F16M 11/08 |
| | | | | 211/107 |
| 3,174,255 A | | 3/1965 | Knell | |
| 3,302,328 A | * | 2/1967 | King | A01G 9/128 |
| | | | | 47/47 |
| 4,048,752 A | | 9/1977 | Anderson | |
| 4,124,185 A | | 11/1978 | Preisinger | |
| 4,176,494 A | * | 12/1979 | Boucher | A01G 9/122 |
| | | | | 256/50 |
| 4,519,162 A | * | 5/1985 | Stuckey | A01G 9/12 |
| | | | | 47/47 |
| 4,534,129 A | * | 8/1985 | Stuckey | A01G 9/128 |
| | | | | 47/47 |
| D362,356 S | | 9/1995 | Nicholas | |
| D396,390 S | | 7/1998 | Edmondson | |
| D403,560 S | * | 1/1999 | Ruggiero | D8/1 |
| 7,331,140 B1 | * | 2/2008 | Mason | A01G 9/122 |
| | | | | 47/47 |
| 8,322,071 B1 | * | 12/2012 | Spero | A01G 9/128 |
| | | | | 47/47 |
| 10,477,782 B1 | * | 11/2019 | Long | A01G 9/12 |
| 2005/0044786 A1 | | 3/2005 | Mastronardi | |
| 2009/0183428 A1 | * | 7/2009 | Agullo | A01G 9/128 |
| | | | | 47/44 |
| 2015/0033623 A1 | * | 2/2015 | Mauro | A01G 9/12 |
| | | | | 47/47 |
| 2017/0172072 A1 | * | 6/2017 | Jablonski | A01G 17/04 |

* cited by examiner

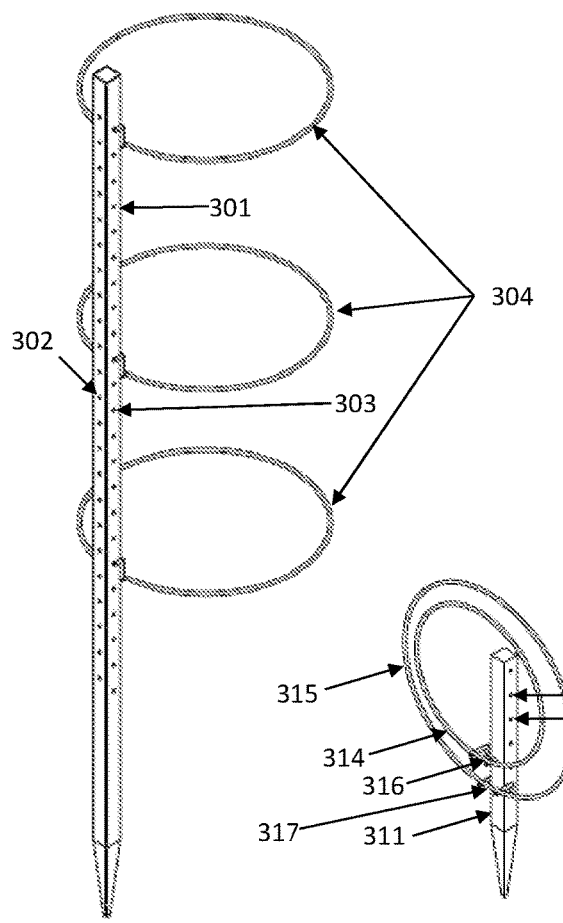
Fig 3(a)
Fig 3(b)
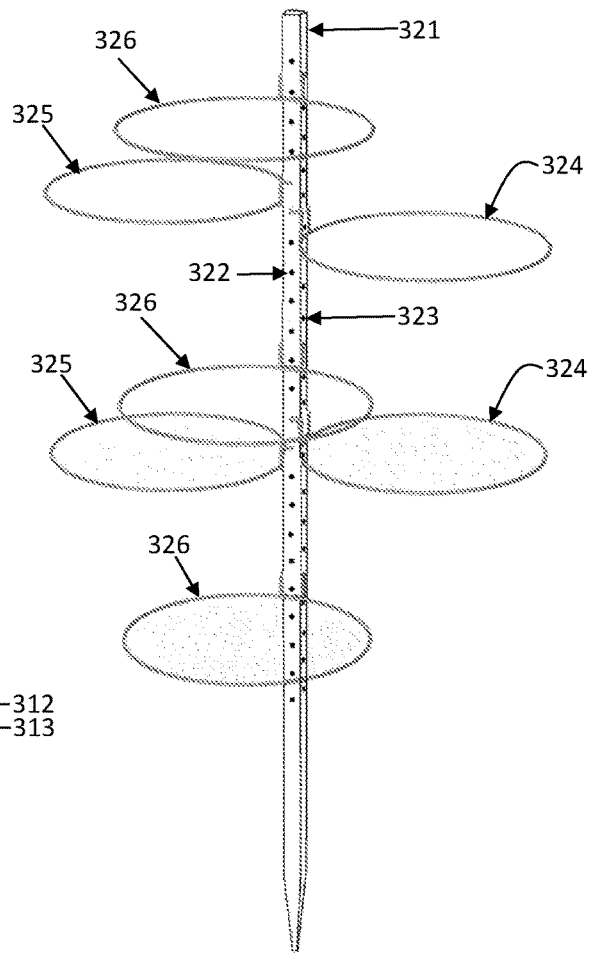
Fig 3(c)

PLANT SUPPORT APPARATUS

FIELD OF THE INVENTION

The present application for patent is in the field of support structures such as might be used in gardening, and more specifically, in the field of assemblies for holding plants and the like.

BACKGROUND

Plant supports typically consist of a stake driven into the ground next to the plant, to which the plant stem (a term used here generically to include the trunk and branches of bushes, sapling trees, vines and the like) is held by means of attachments or ties, such as string, wire ties or straps of plastic or of other flexible materials. They have been used by horticulturalists for some time. However, the stake is usually driven into the soil near the base of the stem, which can inflict damage on the root ball of the plant. Moreover, tying the plant to a stake may interfere with stem growth in length and girth, causing deformities in the stem and potential damage to plant products such as fruits and vegetables.

A variety of other plant support structures are known in the art U.S. Pat. No. 7,735,259, issued Jun. 15, 2010, discloses stakes and cross braces attached to each other by means of clamps. U.S. Patent Application Publication No. 2005/0039394 discloses a plant support structure comprising stakes, hoops and clamps. Further, U.S. Patent Application Publication No. 2015/0059241 discloses a plant support structure comprising two or more support rods and two or more bracing members that comprise fasteners and generally annular structures such as "hoops."

The above devices may generally be used to hold plants off the ground. However, sturdy support for the plant often depends on the vertical structures going sufficiently deep into the ground so that plants, heavy with their fruits or vegetables will not tip over. With more than one support pole, it is often difficult to penetrate the ground with each pole while avoiding rocks, roots or other obstructions in the soil. In addition, the fixtures that enclose the plants are not deployed situationally in order to obtain optimum support. These and other needs are addressed in the disclosure herein.

BRIEF DESCRIPTION OF THE DRAWINGS

FIG. 1 illustrates an embodiment of a unitary open hoop.

FIG. 3 illustrates various views of an embodiment of a support device with several hoops as described herein. FIG. 3(a) illustrates a pole with several hoops configured for use. FIG. 3(b) illustrates a pole with hoops in a folded position, and FIG. 3(c) illustrates a pole with hoops deployed in a front-to-back and side-to-side configuration.

DETAILED DESCRIPTION OF THE DRAWINGS

Figure 1A:
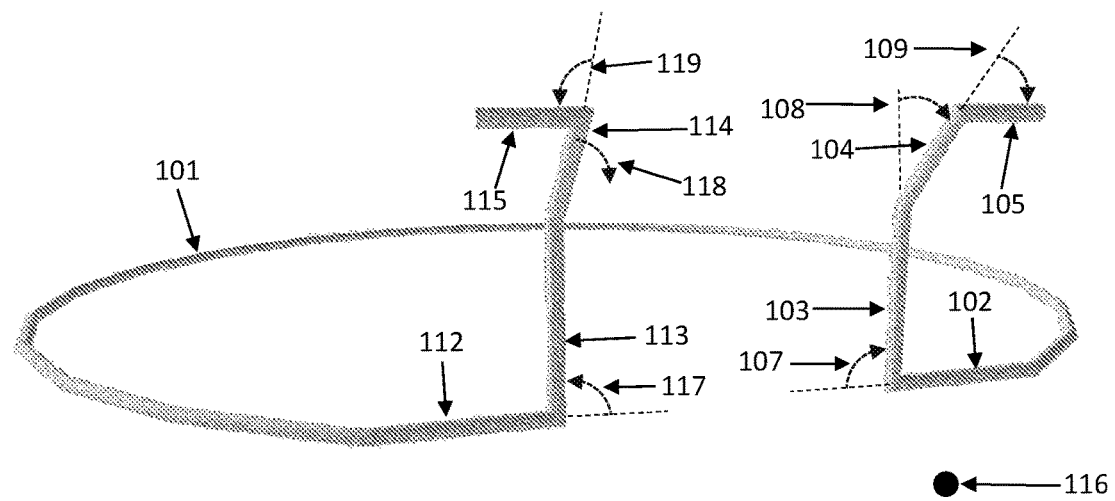
FIG. 1(a) depicts an embodiment of a unitary open hoop uncompressed.

FIG. 1 illustrates an embodiment of a unitary open hoop. FIG. 1(a) depicts an embodiment of an uncompressed unitary open hoop. The unitary open hoop 101, approximately in a plane, is shown having a first end portion comprising, optionally, 102 and/or 104, as well as 103, and 105, and a second end portion, comprising, optionally, 112 and/or 114, as well as 113, and 115. In this embodiment, relative to reference point 116, the first end portion comprises a first extension 103, formed as if bent clockwise out of the plane of the hoop, in accordance with dashed instruction 107, a second extension 105, formed as if bent clockwise to be approximately parallel to the nearest segment on the hoop 102 in accordance with dashed instruction 109. Optionally, an alignment adjustment, indicated by 108 may be formed as if bent to produce segment 104, such that 104 tilts toward reference point 116. In this embodiment, relative to reference point 116, the second end portion comprises a third extension 113, formed as if bent counterclockwise out of the plane of the hoop, in accordance with dashed instruction 117, a fourth extension 115, formed as if bent clockwise to be approximately parallel to the nearest segment on the hoop 112 in accordance with dashed instruction 119. Optionally, an alignment adjustment, indicated by 118 may be formed as if bent to produce segment 114, such that 114 tilts toward reference point 116, positioned along an approximate diameter passing midway between the first end portion and the second end portion.

Further optionally, segments 102 and 112 may be formed as if bent such that they are approximately parallel to one another.

Figure 1B:
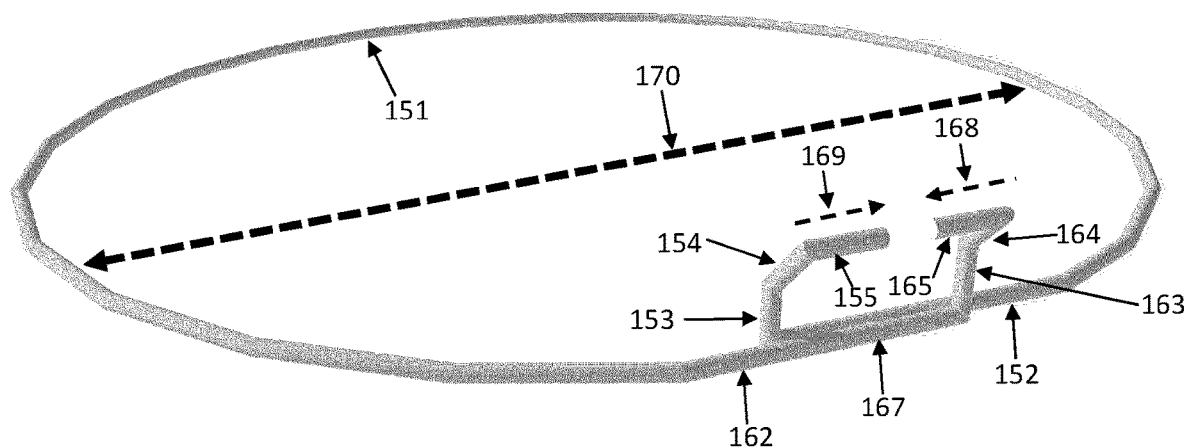
FIG. 1(b) depicts an embodiment of a unitary open hoop compressed to allow mating with a set of diametrically opposed holes on a pole or other structure.

FIG. 1(b) depicts an embodiment of a unitary open hoop 151 compressed to allow mating with a set of diametrically opposed holes on a pole or other structure, such that the first end portion and the second end portions, terminating at segments 155 and 165 mate with a set of diametrically opposed holes. Compressing the hoop results in forces pushing outwardly along 170 and inwardly along force vectors 168 and 169. The first end portion comprises segments 153 and 155, and, optionally, segments 152 and 154. The second end portion comprises segments 163 and 165, and, optionally, segments 162 and 164. When the hoop is compressed, segments 152 and 162 form parallel locus 167, which impedes the downward swing of the hoop, once is mounted on the pole, and segments 155 and 165 are formed as if bent to mate with and apply an opposed tension to a pair of diametrically opposed holes in the pole.

Figure 2:
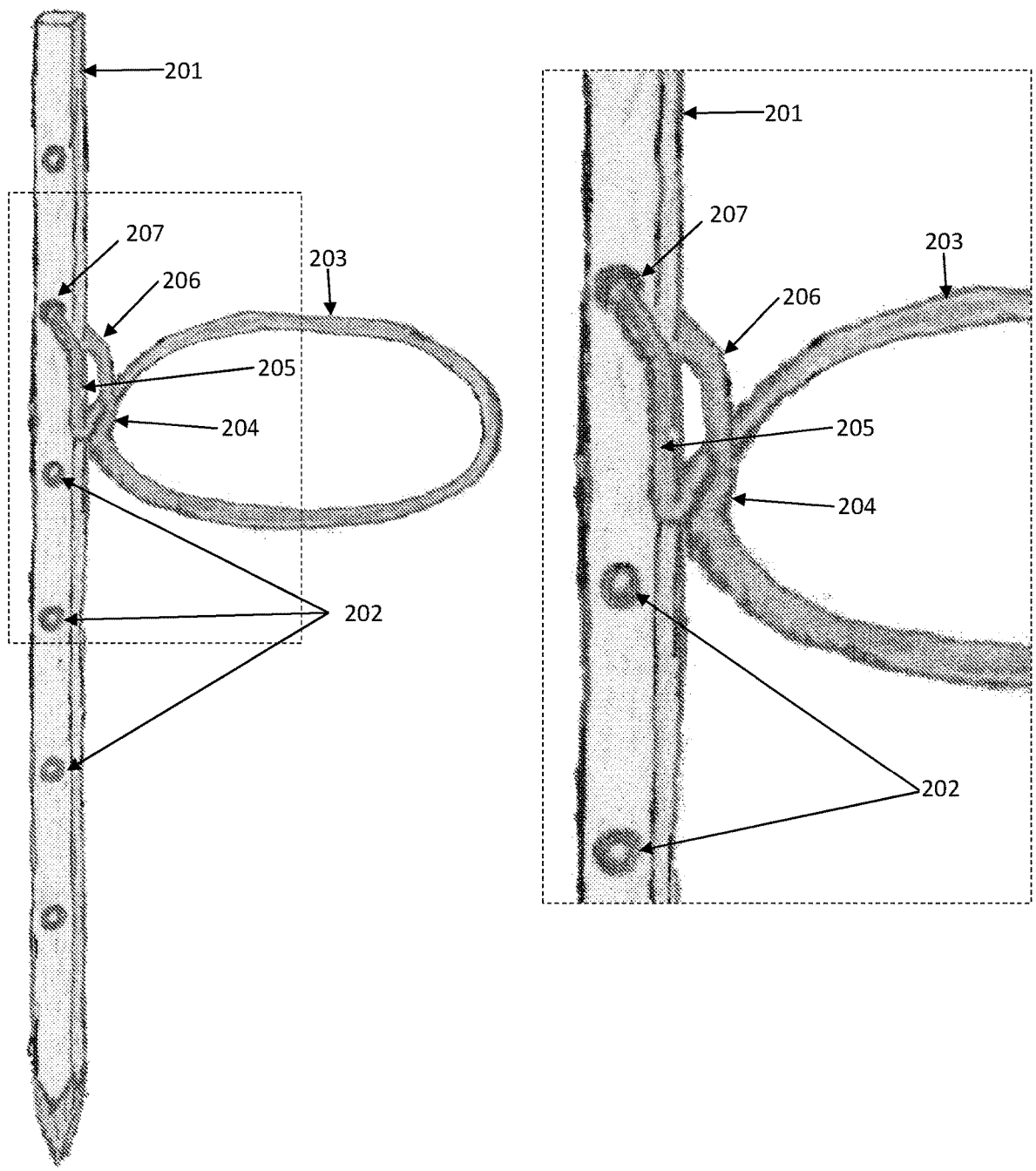
FIG. 2 illustrates an embodiment of a support device for a plant or other object, having a unitary open hoop compressed to allow mating with a set of diametrically opposed holes on a pole.

FIG. 2 illustrates an embodiment of a support device for a plant or other object, having a unitary open hoop compressed to allow mating with a set of diametrically opposed holes on a pole. A cutaway view is enlarged for greater clarity. Shown are the pole 201, holes 202 with diametrically opposed holes on the other side of the pole (not shown). The hoop 203 is compressed to form a parallel locus 204, which impedes the downward swing of the hoop, once is mounted on the pole, and so that the first end portion 205 and the second end portion 206 can mate with the diametrically opposed holes, illustrated by 207.

FIG. 3 illustrates various views of an embodiment of a support device with several hoops as described herein, FIG. 3(a) illustrates a pole with several hoops configured for use. A pole 301 having multiple pairs of diametrically opposed holes, illustrated by 302, and 303, (holes on opposite sides of the pole not shown) allows placement of hoops 304. FIG. 3(b) illustrates a pole with hoops in a folded position. A pole 311 having multiple pairs of diametrically opposed holes, illustrated by 302, and 303, (holes on opposite sides of the pole not shown) allows placement of hoops 314 and 315. When in use the parallel loci 316 and 317 impede the vertical swing rotation of the hoops downward below the approximate level position but permit the upward swing as shown for storage. FIG. 3(c) illustrates a pole 321 with hoops deployed in a front 326-to-back and side 324-to-side 325 configuration, illustrating how diametrically opposed holes 322 and 323 (opposite sides not shown) can be configured to permit such placement.

DETAILED DESCRIPTION

As used herein, the conjunction "and" is intended to be inclusive and the conjunction "or" is not intended to be exclusive unless otherwise indicated or required by the context. For example, the phrase "or, alternatively" is intended to be exclusive.

As used herein, the words "comprise" or "comprising" are understood in a non-limiting sense to mean that items following the word are included, but items not specifically mentioned are not excluded. The words, "include" and "contain" may be used interchangeably with the "comprise," as may be appropriate.

As used herein, the word "exemplary" is understood to be an adjective serving to point out an illustrative example and is not intended to indicate preference in any way.

A reference to an element by the indefinite article "a" does not exclude the possibility that more than one of the elements is present, unless the context clearly requires that there be one and only one of the elements. Thus the statement that a structure comprises two specified elements includes the possibility that the structure includes two, three, four or more such specified elements, as well as unspecified elements.

As used herein, the term "plant" is not limiting and while in one embodiment, the support apparatus disclosed herein is suitable for supporting tomato plants, it is not intended that the use of the support apparatus be limited to tomato plants or to any specific plant types. In embodiments, the poles, and hoops are used with or for all manner and variety of plants, shrubs, vines, small trees and the like, and those skilled in the art will readily identify and implement suitable adaptations for use with particular plant types or other objects beside plants. Without limitation support apparatuses according to embodiments are suitable to support all manner of climbing and fruit bearing plants and plants requiring additional support for their growth and by way of example and not limitation support apparatuses according to embodiments are suitable for use with all manner of climbing plants such as peas, snap peas, snow peas, fruit bearing plants such as fruit trees, such as orange, lemon, apple, pear, peach, cherry, flowering plants such as those with heavy flowers such as peonies, and sunflowers, and vines such as grape, tomato, and cucumber. Further non limiting examples of particular plant types with which embodiments are useable include beans, tomatoes, cucumbers, melons, pumpkins, roses, lilies, peonies, clematis, morning glory, wisteria and sunflower. In addition, the term "plant" should not be limiting as by biological kingdom taxonomy. For example, certain embodiments may be suitable for supporting fungi, with or without a stipe, such as mushrooms. Other embodiments may be suitable for supporting non plant objects like bags or lights.

As used herein the term "pole" is used to mean any substantially elongated structure that is or can be used in combination with the hoops disclosed herein to form a plant support apparatus. Drawings of poles having holes, herein depicted on one side are assumed to have diametrically opposed holes on the other side, configured so as to accommodate hoop end portion segments such as those shown at 155 and 165 of FIG. 1.

Diametrically opposed holes are understood to be oriented approximately along a diameter that defines a circle in which the pole cross section is inscribed. Diameters may be at selected angles to one another. For example, in a pole having a square or rectangular cross section, it may be convenient to have diameters oriented at 0° or 90° relative to one another. In a pole having a hexagonal cross section, it may be convenient to have diameters oriented at 0°, 60°, or 120°, relative to each other.

As used herein, the qualifiers, "about" or "approximately" are understood to allow adaptation to environmental or local variations in certain quantities. For example, a pole aligned in an approximately vertical orientation may depart somewhat from 90° relative to the horizon so as to accommodate the presence of rocks or other debris in the soil or because the weight distribution of a supported plant has become skewed, without departing from the inventive concept. A hoop "approximately in a plane" may be bent so that portions are slightly out of plane because of normal wear and tear or other reason without departing from the inventive concept. The terms "about" or "approximately" may also be understood to reflect a reasonable variation in the construction process. When values are quoted without relation to environmental factors, the qualifiers, "about" or "approximately" are understood to mean that the actual value is within +/−20% of the quoted value, unless tighter tolerance is required.

As used herein, the term "formed as if bent" is intended to describe an object that is formed with a measurable angle. Such an object may be bent, extruded, urged and annealed, cast, molded from metal powder, rolled, or formed by any other process known in the art.

Disclosed herein is a support apparatus including: (a) a pole, aligned in an approximately vertical orientation when in use, wherein the pole has one or more pairs of diametrically opposed holes, positioned along the length of the pole; (b) a unitary open hoop, approximately in a plane, comprising an elastic material; and further comprising: a first end portion an a second end portion; wherein, when in use, the hoop is compressed so that the first end portion and the second end portion are urged past each other to form a parallel locus; and wherein when the hoop is compressed, the first end portion and the second end portion are formed as if bent to mate with and apply an opposed tension to a pair of diametrically opposed holes in the pole; and wherein when the hoop is compressed, the parallel locus engages with the pole to impede the vertical swing of the hoop.

Further disclosed herein is an embodiment of the support apparatus, described supra, wherein (c) the first end portion comprises a first extension formed as if bent clockwise out of the plane of the hoop, wherein the first extension, in turn, comprises a second extension, formed as if bent clockwise to be approximately parallel to the nearest segment on the hoop; (d) the second end portion comprises a third extension formed as if bent counter-clockwise out of the plane of the hoop, wherein the third extension, in turn, comprises a fourth extension, formed as if bent counter-clockwise to be approximately parallel to the nearest segment on the hoop; (e) the first and third extensions are formed relative to the same reference point, along an approximate diameter passing midway between the first end portion and the second end portion.

Further disclosed herein is a support apparatus comprising: (a) a pole, aligned in an approximately vertical orientation when in use, wherein the pole comprises one or more pairs of diametrically opposed holes, positioned along the length of the pole; wherein the diametrically opposed pairs of holes are sized to accommodate the second extension and the fourth extensions; (b) one or more unitary hoops, each unitary hoop defining, approximately, a plane, each unitary hoop having a first end portion and a second end portion; wherein the first end portion comprises a first extension formed as if bent clockwise out of the plane of the hoop, wherein the first extension, in turn, comprises a second extension, formed as if bent clockwise to be approximately parallel to the nearest segment on the hoop; wherein the second open end comprises a third extension formed as if bent counter-clockwise out of the plane of the hoop, wherein the third extension, in turn, comprises a fourth extension, formed as if bent counter-clockwise to be approximately parallel to the nearest segment on the hoop; wherein the first and third extensions are formed relative to the same reference point, along an approximate diameter passing midway between the first open end and the second open end.

Further disclosed herein is a plant support apparatus having one or more hoops, described supra, that is assembled by selecting a pair of diametrically opposed holes on the pole; placing the second extension on the unitary open hoop into one of the diametrically opposed holes, compressing the hoop sufficiently to mate the second of the diametrically opposed holes with the fourth extension; and placing the fourth extension into the second of the diametrically opposed holes; provided that the parallel locus is positioned to impede the downward swing of the hoop. The order of the above steps is not intended to be limiting.

The first and third extensions may further comprise an alignment adjustment, formed as if bent, to allow the plane of the hoop to be approximately perpendicular to the pole. An embodiment of such an alignment adjustment may be seen in FIG. 1(a) 108 and 118, such that segments 104 and 114 are formed. The alignment adjustment need not necessarily allow the plane of the hoop to be approximately perpendicular to the pole. It may be convenient to form an alignment adjustment that allows the plane of the hoop to angle up or down out of perpendicular. For example, referring to FIG. 1(a) 108 and 118, segments 104 and 114, the first extension may be formed as if bent away from the hoop through an angle of about 10° to about 80°, and the third extension may be formed as if bent away from the hoop through an angle of about 10° to about 80°.

The end portions of the hoop may further comprise straight segments in the plane of the hoop, such as those in 102, 112, 152, or 162 of FIG. 1. These straight segments may enable a more secure or stable fit to the pole.

The hoop may be may be uncoated or coated by a powder coating or any suitable paint, varnish of sealer. The hoop may comprise stock of square, rectangular circular, or elliptical cross section. Cross sectional dimensions may be selected for convenience and no limitation is contemplated. Exemplary cross sectional dimensions are about 1.0 mm to about 3 cm. Further exemplary cross sectional dimensions are about 2.5 mm to about 1 cm. Still further exemplary cross sectional dimensions are about 4 mm to about 6 mm. When the stock is of cross section other than square or circular, the exemplary cross sectional dimension may be chosen to be the largest of the dimensions.

The hoop may comprise any suitable resilient material. The resilience of the material used to construct the hoop is usually expressed in terms of yield strength. Yield strength is the strength limit for plastic deformation; such that if the stress resulting from the strain of the material exceeds the yield strength, the material will undergo plastic deformation and will not return to its original shape. Yield strengths are measured in units of pressure (force/unit area), such as Pascals (Pa) or Mega Pascals (MPa) Without limitation, exemplary resilient materials may have yield strengths of from about 200 to about 4000 MPa. Further exemplary resilient materials may have yield strengths of from about 410 to about 1200 MPa. Still further exemplary resilient materials may have yield strengths of from about 600 to about 1000 MPa.

Materials that may be used to construct the hoop may comprise spring steel, spring stainless steel, plastic materials, reinforced plastic materials, natural materials such as wood, bamboo and the like. For example, spring steel is generally low-alloy manganese, medium-carbon steel or high-carbon steel with a high yield strength. In one embodiment, the spring steel used in forming a hoop has a yield strength between about 410 to about 1200 MPa. The hoop may also be formed from reinforced polymers, such as, without limitation, carbon fiber reinforced polymer, fiberglass reinforced polymer, nanotube reinforced polymer and the like, In particular, reinforced plastic is a composite material, comprising a matrix and a reinforcement, such as carbon fiber, fiber glass, carbon or other nanotubes or the like. In carbon reinforced polymer materials, the reinforcement is carbon fiber, which provides the strength. The matrix is usually a polymer resin, such as poly-acrylonitrile (PAN), that is used to bind the reinforcement together. Other polymer resins that might be used include, without limitation, polyesters, such as polyethylene terephthalate (PET), glycol modified polyethylene terephthalate, polyethylene naphthalate (PEN), polyether-ether ketone (PEEK), polycarbonates, polyamides such as 3, 4, 6, 66, 6T, 610, 10, 11, or 12, or combinations thereof. Reinforcement materials include, without limitation, whiskers comprising graphite, silicon nitride, aluminum oxide, and silicon carbide, fibers comprising aluminum oxide, aramid (polyamide 49), carbon, e-glass, boron, silicon carbide, ultra-high-molecular-weight polyethylene, and metallic wires comprising: high strength steel, molybdenum, and tungsten.

The pole may comprise any suitable material such as, without limitation, metal, wood, plastic, reinforced plastic, ceramic or the like. Metal poles may be of solid or hollow construction. In particular embodiments, poles include, but are not limited to, stakes commonly used in gardening, and in alternative embodiments the pole may comprise any elongate rod, stick, stake, pole, cane or support and may include wooden stakes, rebar, bamboo sticks, canes, metal rods and the like. In embodiments the poles may comprise two or more segments. In alternative embodiments, poles may consist of or comprise any suitable material and may be of any suitable lengths, widths, depths, or diameters. In other embodiments, the support strut may have variety of cross sections, such as, without limitation, triangular, square, rectangular, circular, elliptical, oval shaped, i-beam, s-beam, i-beam, c-beam, t-beam n-beam, m-beam, n-sided polygonal, where n=5 to 20, conical and the like. In addition, the support strut cross section may comprise combinations of the above or have a generally geometrical shape such as those supra but with additional protrusions such as barbs or other structures that help to anchor the support strut in the ground or impart strength while minimizing materials and weight.

The pole may further comprise one or more steps that allow the user to apply his or her weight to push the pole into the soil. In addition, the step(s) may be configured to stay in an extended position to brace the pole and keep it from tipping over under load.

The pole may also be configured with a pointed end to aid in pushing it into the ground. In addition, pole may be configured with an auger end, for screwing it into the ground. The auger end may comprise a traditional auger shape a "corkscrew" type auger or an equivalent screw-like structure such as a "corkscrew" like structure.

Although the present invention has been shown and described with reference to particular examples, various changes and modifications which are obvious to persons skilled in the art to which the invention pertains are deemed to lie within the spirit, scope and contemplation of the subject matter set forth in the appended claims.

What is claimed is:

1. A support apparatus comprising:
   a. a pole, aligned in an approximately vertical orientation when in use, and a cross section, wherein the pole comprises one or more pairs of diametrically opposed holes, positioned along the length of the pole;
   b. a unitary open hoop, approximately in a plane, comprising an elastic material; and further comprising: a first end portion and a second end portion; wherein
      i. the hoop is compressed so that the first end portion and the second end portion are urged past each other to form a parallel locus; and wherein
      ii. when the hoop is compressed, an entirety of the unitary open hoop rests external to the pole exclusive of the first end portion and the second end portion which each mate with and apply an opposed tension within a pair of diametrically opposed holes in the pole; and wherein
      iii. when the hoop is compressed, the parallel locus and an outside perimeter edge of the unitary open hoop engage with the outside of the pole to impede the vertical swing of the hoop.

2. The support apparatus of claim 1, wherein
   a. the first end portion comprises a first extension bent out of the plane of the hoop, wherein the first extension, in turn, comprises a second extension, bent to be approximately parallel to the nearest segment on the hoop;
   b. the second end portion comprises a third extension bent out of the plane of the hoop, wherein the third extension, in turn, comprises a fourth extension, bent to be approximately parallel to the nearest segment on the hoop;
   c. the first and third extensions are formed relative to the same reference point, along an approximate diameter passing midway between the first end portion and the second end portion.

3. The support apparatus of claim 2, wherein the first extension is bent out of the plane of the hoop, through an angle of about 90° and the third extension is bent out of the plane of the hoop, through an angle of about 90°.

4. The support apparatus of claim 2, wherein the first and third extensions further comprise an alignment adjustment, bent to allow the plane of the hoop to be approximately perpendicular to the pole.

5. The support apparatus of claim 4, wherein the first extension is bent away from the hoop through an angle of about 10° to about 80°, and the third extension is bent away from the hoop through an angle of about 10° to about 80° such that an alignment adjustment is formed.

6. The support apparatus of claim 2, wherein the first end portion and the second end portion each further comprise a straight segment in the plane of the hoop.

7. The support apparatus of claim 1, wherein the pole comprises a plurality of pairs of diametrically opposed holes, positioned along its length.

8. The support apparatus of claim 7, wherein the plurality of pairs of diametrically opposed holes are arranged at offset angles to each other.

9. The support apparatus of claim 8, wherein the pole comprises two or more pairs of diametrically opposed holes arranged at offset angles to each other in such a way that as viewed from above the support apparatus looking down on the vertical pole with a central axis of the pole forming a center point, at least some of the two or more pairs of diametrically opposed holes are configured support a hoop in angularly offset different sectors around the center point.

10. The support apparatus of claim 8, wherein the angularly offset different sectors are offset in orientations between about 0° to about 90° relative to each other.

11. The support apparatus of claim 1, wherein the hoop comprises spring steel or spring stainless steel.

12. The support apparatus of claim 11, wherein the spring steel or spring stainless steel has a circular cross section having a diameter of about 4 to about 6 mm.

13. The support apparatus of claim 11, wherein the spring steel or spring stainless steel has a yield strength between about 410 and about 1200 MPa.

14. The support apparatus of claim 1, wherein the hoop comprises a reinforced polymer, chosen from carbon fiber reinforced polymer, fiberglass reinforced polymer, silicon carbide fiber reinforced polymer, aramid fiber reinforced polymer, or aluminum oxide reinforced polymer.

15. The support apparatus of claim 14, wherein the reinforced polymer has a circular cross section having a diameter of about 4 to about 6 mm.

16. The support apparatus of claim 14, wherein the reinforced polymer has a yield strength between about 410 and about 2000 MPa.

17. The support apparatus of claim 1, wherein a plurality of unitary open hoops are inserted each through one of the one or more pairs of diametrically opposed holes along the length of the pole and each of the plurality of unitary open hoops is substantially concentric with each other of the plurality of unitary open hoops when viewed from above the support apparatus when in a vertical orientation.

18. The support apparatus of claim 1, wherein a plurality of unitary open hoops is inserted each through one of the one or more pairs of diametrically opposed holes along the length of the pole and each of the plurality of unitary open hoops is substantially offset with non-concentric center points of the plurality of unitary open hoops when viewed from above the support apparatus when in a vertical orientation.

* * * * *